United States Patent [19]
Lucchesi

[11] 3,783,395
[45] Jan. 1, 1974

[54] ANALOG WINDOW FOR SCINTILLATION CAMERA

[75] Inventor: Oreste J. Lucchesi, Schaumburg, Ill.

[73] Assignee: G. D. Searle & Co., Chicago, Ill.

[22] Filed: June 7, 1971

[21] Appl. No.: 150,779

Related U.S. Application Data

[62] Division of Ser. No. 835,534, June 23, 1969, Pat. No. 3,655,974.

[52] U.S. Cl. ...... 328/147, 250/71.5 S, 250/203 CT, 328/148, 328/149
[51] Int. Cl. ............................ G01t 1/20, H03k 5/20
[58] Field of Search ................... 250/71.5 S, 71.5 R, 250/203 CT; 307/235 R; 328/146, 147, 148, 149

[56] References Cited
UNITED STATES PATENTS

| 3,502,873 | 3/1970 | Woronowicz | 250/71.5 S |
| 3,011,057 | 11/1961 | Anger | 250/71.5 S |
| 3,329,814 | 7/1967 | Anger | 250/71.5 S X |
| 3,509,341 | 4/1970 | Hindel et al. | 250/71.5 S |
| 3,573,458 | 4/1971 | Anger | 250/71.5 S |
| 3,594,577 | 7/1971 | Loveday | 250/71.5 R |
| 3,626,187 | 12/1971 | Laney | 250/71.5 R |
| 3,697,753 | 10/1972 | Martone et al. | 250/71.5 R X |

OTHER PUBLICATIONS

Anger, "Scintillation Camera;" p. 27–33; The Review of Scientific Instruments (publication); Vol. 29, No. 1, 1/1958.

*Primary Examiner*—John W. Huckert
*Assistant Examiner*—L. N. Anagnos
*Attorney*—Lowell C. Bergstedt

[57] ABSTRACT

Analog window apparatus for use with Anger-type scintillation camera or the like. Two phase-related sinusoidal waveforms of the same frequency determine an analog window of a shape dependent upon the phase relationship. Two comparison circuits receive coordinate signals and the sinusoidal waveforms and register output indications when the amplitudes of the waveforms exceed the amplitudes of corresponding coordinate signals and a gate and hold circuit registers an output when coincident output indications are received at some instant during a comparison period lasting at least one period of the waveforms.

10 Claims, 11 Drawing Figures

ANALOG WINDOW FOR SCINTILLATION CAMERA

This is a division of application, Ser. No. 835,534, now U.S. Pat. No. 3,655,974, filed June 23, 1969.

Scintillation cameras for imaging the distribution of radioactivity throughout an organ of the human body are now in widespread use in nuclear medicine departments of hospitals throughout the world. The most widely used camera is the commercial version of the Anger-type camera described in U.S. Pat. No. 3,011,057. The ability of the Anger-type scintillation camera to produce a rapid, good quality picture of the distribution of an injected radioisotope has enhanced the diagnostic capabilities of doctors in some very important clinical situations. In some of these situations, it is valuable to be able to select particular portions of the organ or particular portions of the image of that organ for separate study and for comparison with other regions of the organ. Thus, for example, it may be useful to compare the total amount of radioactivity in one selected portion of a lung with that in a portion located at another region. In other situations, it may be useful to have an integral count of the activity detected in a selected region of the organ. In addition, the ability to segregate information coming from a selected region of the organ can be utilized in connection with a multichannel analyzer to produce activity profiles or time histograms which may provide additional useful information in some diagnostic situations. Apparatus to provide such a "window" capability is particularly useful in connection with direct data storage systems since, upon replay of the data, various windows can be selected and thus any particular area of the organ can be segregated for special attention or study.

One of the known methods for selecting only certain portions of an organ for study of the data accumulated from that region involves storing the overall image data on a matrix basis in a multi-channel analyzer which incorporates analog-to-digital conversion of $x$ and $y$ coordinate signals from the camera and storage of an event in a particular location of the matrix in accordance with that digitized information. For example, a 1,600 channel analyzer would provide a 40 by 40 matrix of data points with each of the data points representing a small area of the organ under investigation. Upon completion of accumulation of data in the 40 by 40 matrix, various methods can be used to segregate the information stored in a number of contiguous channels defining a particular region of interest of the organ. This "digital window" approach to segregating information is accomplished on a gross count-per-channel basis and can provide a profile through the organ at a selected location with ease.

Another way of providing spatial windows for the scintillation camera makes use of straightforward single channel pulse height analysis on the respective $x$ and $y$ coordinate pulses to provide a rectangular "analog window." This is an adaption of the technique of using a single channel analyzer on a spectrum of energy pulses to segregate a portion of the energy spectrum for analysis. Rectangular windows can be provided at any location merely by shifting the coordinate system to the particular location desired before performing pulse height analysis on the $x$ and $y$ pulses. These rectangular windows provide only limited capability of selecting regions of the organ under study for special attention. If the desired region has other than a rectangular shape, the window cannot be accurately fit to the region, and data from adjacent regions will be included. It is clearly desirable to be able to form analog windows that have a variety of possible shapes to accomplish a more exact fitting of the window to the area to be studied.

Therefore, it is the principal object of this invention to provide improved analog window apparatus for two-dimensional detecting apparatus.

More particularly, it is an object of this invention to provide improved analog window apparatus for an Anger-type scintillation camera.

Another object of this invention is to provide analog window apparatus capable of defining windows which have a variety of preselectable shapes.

In general, this invention features the generation of a pair of phase-related periodic waveforms for simultaneous comparison with $x$ and $y$ coordinate signals to signal whether the point defined by the $x$ and $y$ coordinate signals is within the analog window determined by the periodic waveforms. The shape configuration and size of the analog or spatial window is determined by the phase and amplitude relation of the periodic waveforms as well as their general shape and maximum amplitudes. In a preferred embodiment of this invention, which may be used in conjunction with an Anger-type camera, a pair of sinusoidal waveforms are used to determine spatial windows which are generally of rectangular or circular configuration depending on the phase relationship of the waveforms. If the sinusoidal waveforms are substantially in-phase, a generally rectangular window is generated with the width and height of the window depending upon the maximum amplitudes of the respective waveforms. Correspondingly, a generally circular window is determined when the sinusoidal waveforms are substantially 90° out-of-phase, with the width and height of the window again determined by the respective maximum amplitudes of the waveforms. Waveforms of substantially equal maximum amplitude provide an almost perfectly circular window, whereas a large variance between the maximum amplitudes of the waveforms results in an elongated or elliptical window. Thus, the overall size, configuration and other aspects of the analog or spatial window are determined by the phase relationship of the periodic waveforms and the magnitudes and relationship of the maximum amplitudes thereof.

The comparison of each of these waveforms with its corresponding coordinate signal is accomplished in a particularly advantageous fashion by feeding the respective coordinate signals and associated periodic waveforms to comparison circuits which provide an output indication during the interval, if any, when the input periodic waveform has an amplitude greater than or equal to the magnitude of the input coordinate signal. The particular point represented by the $x$ and $y$ coordinate signals is registered as being within the spatial window only when coincident output indications occur during a comparison period. The comparison period must be at least as long as one full period of the periodic signals, but it does not matter when the comparison is initiated as long as the periodic signals complete one full cycle.

If the coordinate signals take on both positive and negative amplitude, the absolute values of these amplitudes are produced before comparison with the corresponding periodic signals. In this manner it is possible to provide analog window apparatus in which the size and shape of the window can be preselected for optimizing the fitting of the window to the area that is desired to be studied. The general location of the analog window on the detecting area can be manipulated by including appropriate axis-shifting circuitry so that the x and y coordinate signals are related to a selectably positioned coordinate system with the window surrounding the origin of that coordinate system. By proper duplication of some elements of the system a plurality of analog windows can be provided, and these windows can be added or subtracted in known fashion.

Other objects, features and advantages of this invention will be apparent from a consideration of the following detailed description in conjunction with the accompanying drawings in which:

FIG. 1 is a block schematic diagram of analog window apparatus in accordance with this invention;

FIG. 2 comprises a series of waveform and pulse diagrams useful in explaining the operation of the apparatus shown in FIG. 1;

Figure 1:
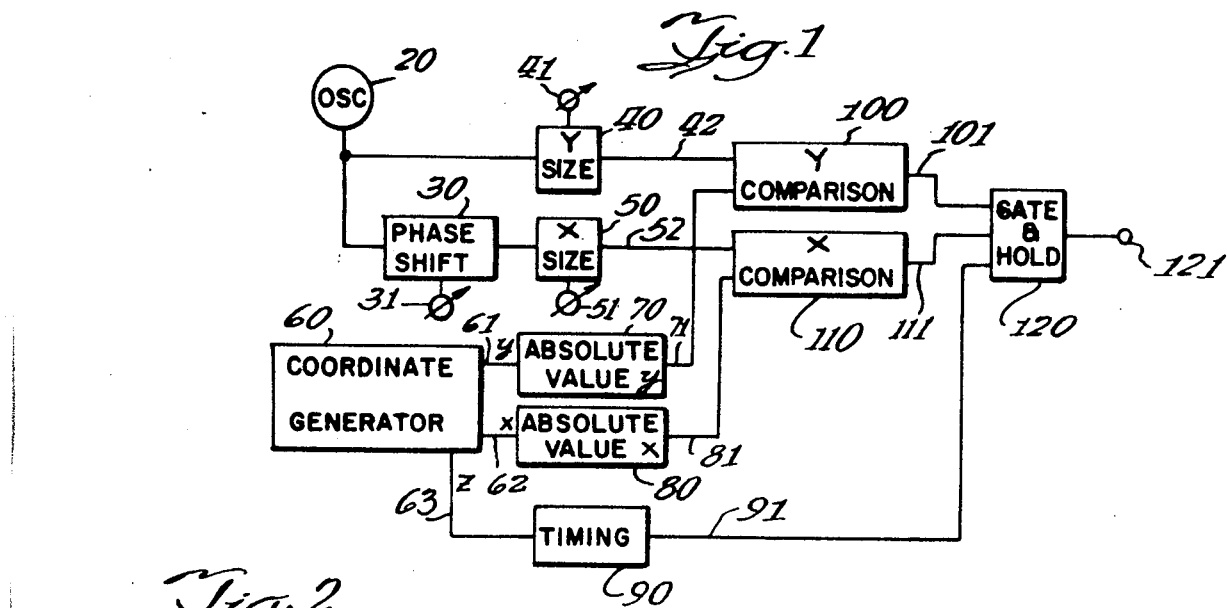

In FIG. 1 the various elements of an analog window apparatus are shown in block form. An oscillator 20 produces an sinusoidal waveform which is fed to two separate signal branches, one containing a Y size control circuit 40 and the other containing a phase shift network 30 and an X size control circuit 50. Phase shift network 30, which may be any well-known circuit or apparatus for providing signal phase shifting, has a variable control 31 signifying that the amount of phase shifting accomplished by the network may be preselected. Correspondingly, Y size control circuit 40 and X size control circuit 50, which may be attenuators or other variable gain circuits, have variable controls 41 and 51, respectively. The output of phase shift network 30 is a sinusoidal waveform which, in accordance with the setting of control 31, is shifted in phase with respect to the waveform output from oscillator 20. It should be understood, of course, that phase shift network 30 may introduce a 0° phase shift, in which case its presence in the circuit would be superfluous. The X and Y size control circuits control the amplitudes of the waveforms on their respective output leads 52 and 42. Thus, the signals on leads 42 and 52 and X and Y sinusoidal waveforms having a preselected phase relationship and each having a preselected maximum amplitude.

A coordinate generator 60, which may be an Anger-type scintillation camera or other detecting system, produces x and y coordinate signals, which may be voltage pulses, on leads 62 and 61, respectively, and a Z or triggering signal, which may be a voltage pulse also, on lead 63. A z signal will accompany each pair of coordinate signals x and y on leads 61 and 62 which are to be analyzed and in some cases may be derived from one or both of the coordinate signals. Absolute value x and absolute value y circuits 80 and 70 transform the coordinate signals x and y on leads 61 and 62 into $|x|$ and $|y|$ signals on leads 81 and 71. Thus, circuits 70 and 80 may each be any type of circuit which produces a positive output pulse of an amplitude equal to the absolute amplitude of a positive or negative input pulse. Y comparison circuit 100 receives the Y sinusoidal signal on lead 42 and the $|y|$ signal on lead 71 and produces an output indication (typically a positive pulse indicating a binary 1 state) on output lead 101 during an interval when the amplitude of the Y sinusoidal signal on lead 42 is equal to or greater than the amplitude of the $|y|$ signal on lead 71. Correspondingly, X comparison circuit 110 receives the X sinusoidal waveform on lead 52 and the $|x|$ signal on lead 81 and produces an output indication on output lead 111 during an interval when the X sinusoidal signal on lead 52 has an amplitude which is equal to or greater than the amplitude of the $|x|$ signal on lead 81.

Timing circuit 90 responds to a Z pulse from coordinate generator 60 to produce an output pulse on lead 91 for a period of time at least as great as the length of one period of the sinusoidal waveforms on leads 42 and 52. Gate and hold circuit 120 receives the signals on leads 101, 111 and 91 to produce an output pulse on terminal 121 only when simultaneous or coincident output indications appear on leads 101 and 111 in the presence of a timing signal on lead 91.

Figure 3:
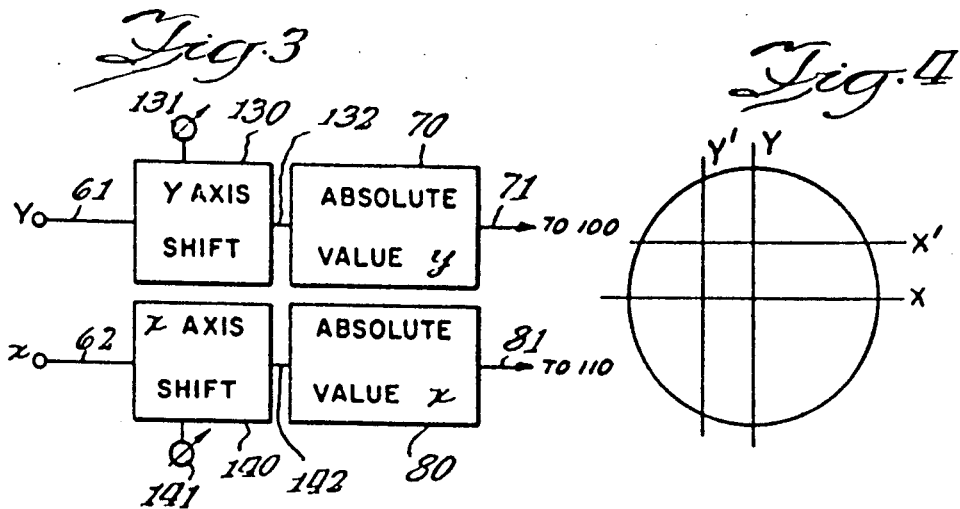
FIG. 3 is a block schematic diagram illustrating a modified form of the apparatus shown in FIG. 1.
Figure 4:
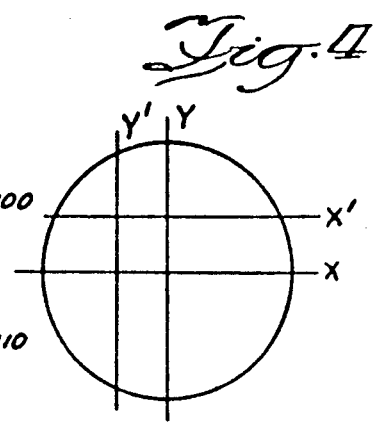
FIG. 4 is a drawing illustrating the operation of the circuitry shown in FIG. 3.

Referring now to FIGS. 3 and 4, X-axis shift circuit 140 and Y-axis shift circuit 130 may be introduced into the system ahead of absolute value x circuit 80 and absolute value y circuit 70 to provide a shift in the location of the coordinate system. In other words, the x and y coordinate signals on leads 62 and 61 are related to a coordinate system X and Y, and the X- and Y- axis shift networks change the x and y coordinate signals to x' and y' coordinate signals related to an X' and Y' coordinate system which can be placed at any location in the X and Y system. Where the x and y signals are voltage pulses, axis shifting can be accomplished by adding thereto fixed DC signals of a selected magnitude and polarity. Thus, X-axis shift circuit 140 and Y-axis shift circuit 130 are shown with variable controls 141 and 131 to indicate that the amount and direction of the respective shifting may be preselected by controlling the magnitude and polarity of the DC voltage added to each coordinate signal.

Figures 5, 6:
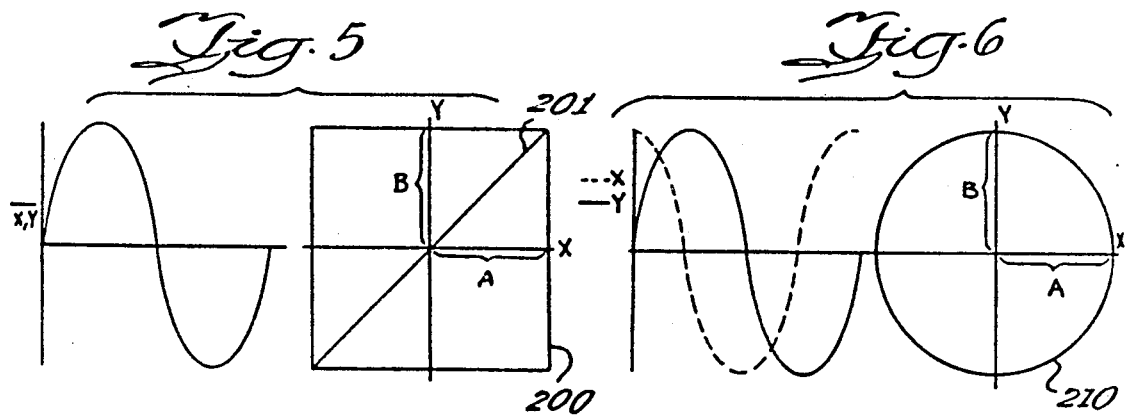
FIGS. 5 through 8 are drawings which depict the various shapes of analog windows obtained with various selected phase relationships between the periodic signals.

FIGS. 5 through 8 show the various shapes of analog windows that can be generated by the circuitry in FIG. 1. Referring to FIG. 5 in connection with FIG. 1, it will be noted that, when the X and Y sinusoidal waveforms on leads 42 and 52 are "in phase," a rectangular analog window 200 results. The line 201 running diagonally through the region of the X, Y coordinate system is the path that a point would follow in taking on the time-varying x and y values of the in-phase sinusoidal waveforms. It will be noted here that the waveforms have identical amplitude so that the analog window is square. It should be understood, however, that the amplitudes may be independently chosen to provide an analog window which is rectangular and has any desired x and y dimension. The analog window determined by in-phase sinusoidal waveforms is rectangular because the X and Y comparison circuits 110 and 100 in FIG. 1 will produce coincident output indications any time the |x| and |y| signals of a coordinate event are respectively less than the maximum amplitudes A and B of the X and Y sinusoidal waveforms. Accordingly, it will be seen that any combination of x and y coordinate signals, where the magnitude of the x coordinate signal is less than the value A and magnitude of the y coordinate signal is less than the value B, will produce an output on terminal 121.

The analog window 200 is symmetrical about the origin of the X, Y coordinate system because the absolute values of the x and y coordinate signals are used so that the second through fourth quadrants of the coordinate system are, in essence, mapped into the first quadrant. Again, it should be noted that the values A and B and thus the shape of the rectangular window may be selected by selecting the amplitudes of the X and Y sinusoidal waveforms. It should also be noted here that any other form of in-phase periodic waveform would also generate a rectangular or square analog window.

Referring now to FIG. 6 in connection with FIG. 1, it can be seen that when the sinusoidal waveforms on leads 42 and 52 are out-of-phase by 90°, the analog window becomes an area bounded by a circle 210. Here again, it is only a circle because the maximum amplitudes of the X and Y sinusoidal waveforms are equal. However, at any point in time, the respective amplitudes of the X and Y sinusoidal waveforms are not equal since the waveforms are out-of-phase. If one of the waveforms has a larger maximum amplitude than the other, the resulting window will be elongaed in the direction of one axis or the other, and, of course, the overall size of the window is controllable by the selection of the maximum amplitudes of the X and Y sinusoidal waveforms. The circular nature of the analog window in this case can be seen by analyzing the response of the apparatus in FIG. 1 to various sets of x and y coordinate signals. If the x coordinate signal has an absolute value equal to A, an output from X comparison circuit 110 will occur the instant the X sinusoidal waveform on lead 52 reaches a maximum positive amplitude A. At this point in time, the sinusoidal signal on lead 42 is necessarily at 0 amplitude because of the 90° phase difference, and thus an output from Y comparison circuit 100 will coincide with the output from X comparison circuit 110 only if the y coordinate signal has a zero value. For slightly lesser absolute amplitudes of the x coordinate signal, the waveform on lead 52 will produce an output from X comparison circuit 110 during a time interval when a coincident output from Y comparison circuit 100 may occur if the y coordinate signal has a small enough value that the amplitude of the signal on lead 42 reaches or exceeds the value of the y coordinate signal. It is clear that the path traced out by a point following the values of the sinusoidal waveforms when they are 90° out-of-phase is the circular path 210 defining the bounds of the analog window in this case.

Figures 7, 8:
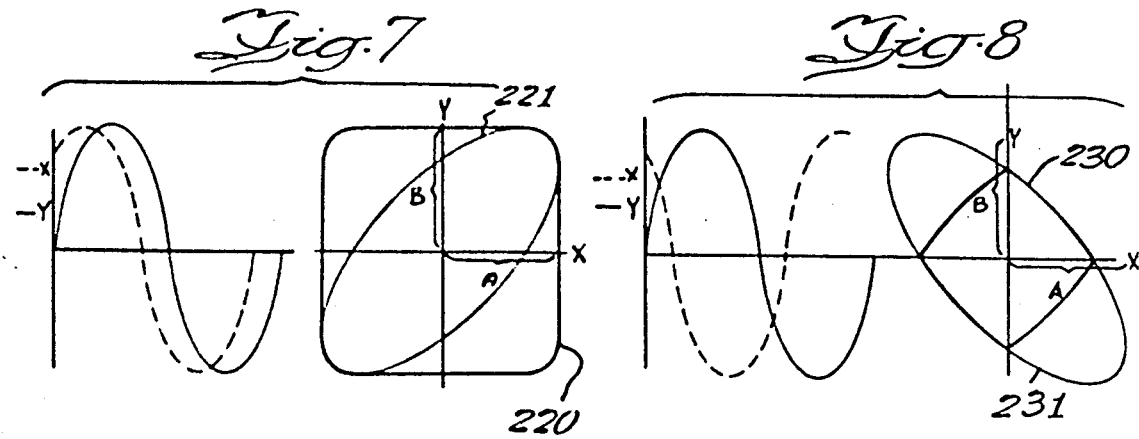

The rectantular and circular shapes shown in FIGS. 5 and 6 are probably the most useful window shapes and these can be provided in a system shown in FIG. 1 by switching in and out a strictly 90° phase shift network instead of providing a completely variable phase shift network. However, by providing a completely variable phase shift network, that is, one that is capable of providing a phase shift between 0° and 180°, other types of analog window shapes such as those shown in FIGS. 7 and 8 can also be generated. The type of analog window shape shown in FIG. 7 is generated when the X and Y sinusoidal waveforms are between 0° and 90° out-of-phase. It will be noted that in this case the window is generally rectangular with the corners of the rectangle rounded off in accordance with the shape of the ellipse 221 which is the path of a point tracing out the amplitudes of the X and Y sinusoidal signals on a time-varying basis. When the X and Y sinusoidal signals are only slightly out-of-phase, the ellipse 221 is very narrow and only a slight rounding off of the corners is produced. As the phase shift approaches 90°, the rounding off becomes more pronounced and the circular shape shown in FIG. 6 is approached. In FIG. 8, the diamond shape window 230 is produced when the X and Y sinusoidal waveforms are between 90° and 180° out-of-phase. The ellipse 231 represents the path traced out by a point following the amplitudes of the X and Y sinusoidal signals. The segment of the ellipse 231 in the first quadrant of the coordinate system determines the shape of the window since the absolute values of the x and y coordinate signals are used. Here again, it will be seen that with X and Y sinusoidal waveforms only slightly greater than 90° out-of-phase, the ellipse 231 is almost a circle so that the diamond shape has very rounded sides. As the sinusoidal waveforms approach 180° out-of-phase, the ellipse 231 narrows so that the sides of the diamond become substantially straight. It will be noted that with respect to the maximum amplitudes A and B of the sinusoidal waveforms, the diamond shape of the analog window has its maximum X coordinate less than the value of A and the maximum Y coordinate is less than the value of B. The reason for this is obvious because the X and Y sinusoidal signals are simultaneously in their positive portion of the cycle for only a very short period of time and the respective x and y values of coordinate signals which will produce outputs from X and Y comparison circuits are relatively small.

Figure 2:
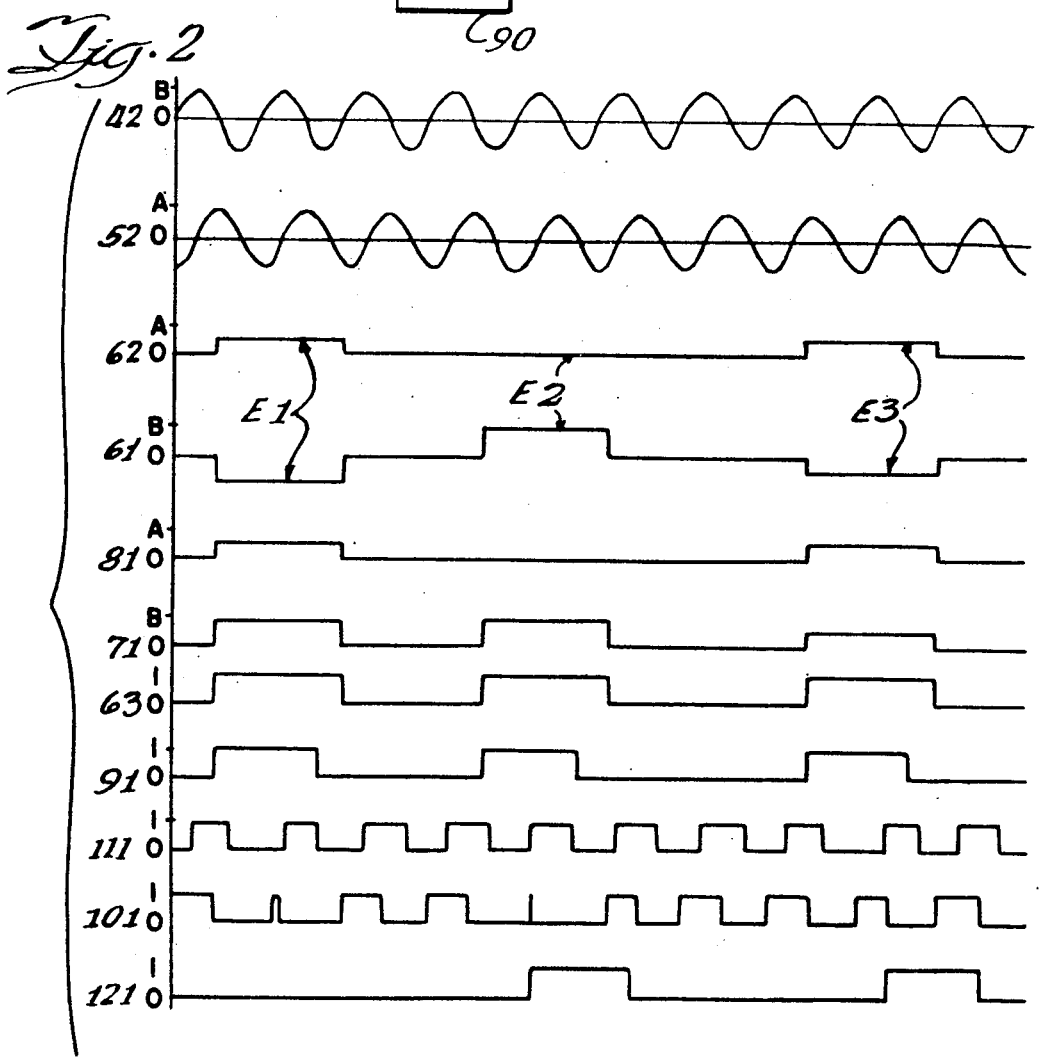

Referring now to FIG. 2 in connection with FIG. 1, the operation of the analog window circuitry will be explained in more detail. The sinusoidal and pulse waveforms shown in FIG. 2 represent the signals on the various leads identified by number in FIG. 1. Thus, the sinusoidal signals 42 and 52 represent the waveforms on leads 42 and 52 input to X and Y comparison circuits 100 and 110. The pulse waveforms 62 and 61 represent a series of coordinate events E1, E2 and E3 occurring on leads 62 and 61. The pulse waveform 81 represents the absolute amplitude of the pulse waveform 62 and the pulse waveform 71 represents the absolute amplitude of the pulse waveform 61. The waveform 63 represents the Z or triggering output which indicates that the coordinate event is one of the type that is desired to be analyzed. The waveform 91 is the timing waveform which produces the comparison interval of a length at least as great as one period of the sinusoidal waveforms 42 and 52. Waveforms 111 and 101 are the output waveforms respectively from X and Y comparison circuits 110 and 100 and the waveform 121 is the output waveform from gate and hold circuit 120.

Referring now to event E1, it will be noted that no output on output terminal 121 is produced during the timing interval defined by the signal on lead 91. The reason for this is that the waveforms 111 and 101 do not simultaneously have a 1 value during the timing interval defined by the 1 value of the signal on lead 91. This means that the point defined by the coordinate signals 62 and 61 is outside the area of the analog window defined by sinusoidal waveforms 42 and 52.

The event E2 produces an output on output lead 121 because the X value is 0 and Y value is B, so the point represented by the coordinate signals 62 and 61 is on the top of the circle outlining the analog window. The output pulse on lead 121 is produced during the timing interval defined by the signal on lead 91 at the time when the signals on leads 111 and 101 both have a 1 value. This simultaneous occurrence of the 1 value signal on these two leads indicates that X and Y sinusoidal signals have simultaneously equalled or exceeded the amplitude of the |x| and |y| coordinate signals. In this instance, this happens when the Y sinusoidal signal 42 has reached its maximum amplitude B.

The event E3 also produces an output pulse on terminal 121 because the coordinates which make up that event are within the circle defining the boundary of the analog window. Here again, the output pulse 121 occurs at the time when the signals on leads 111 and 101 simultaneously have a 1 value during the timing interval signal on lead 91. It will be noted that the signals on leads 111 and 101 in the absence of x and y coordinate signals on leads 62 and 61 vary between the 0 and 1 level in accordance with the positive and negative half cycles of their sinusoidal waveforms. However, when no coordinate event is present, there is no timing signal on lead 91 so the simultaneous occurrence of 1 value signal outputs on leads 111 and 101 does not produce an output pulse on lead 121.

Figure 9:
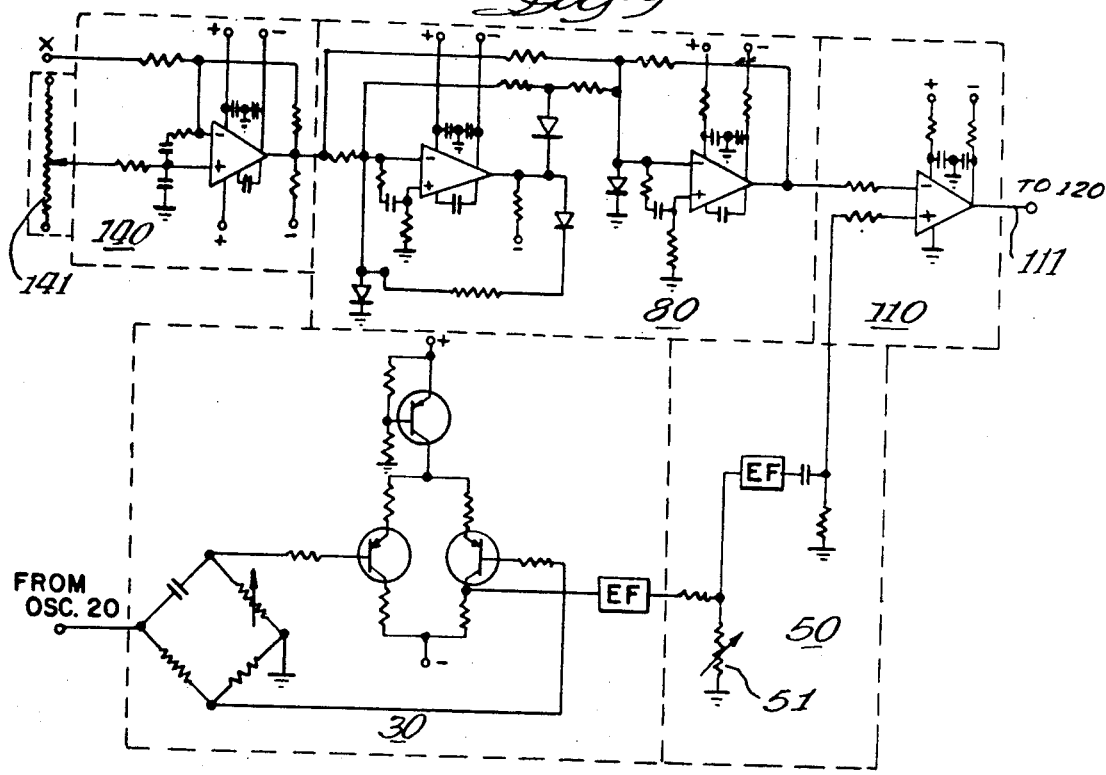
FIG. 9 is a circuit schematic diagram of a portion of the apparatus shown in block form in FIGS. 1 and 3.
Figure 10:
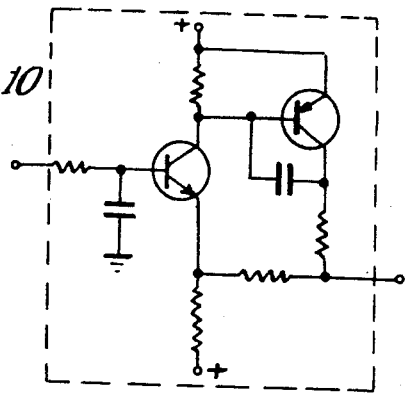
FIG. 10 is a circuit schematic diagram showing the details of one of the portions of the circuitry in FIG. 9.

In FIG. 9 detailed circuitry which may be used in some of the blocks shown in FIGS. 1 and 3 is illustrated. Thus, 140 refers to an X-axis shifting circuit which functions under the control of a potentiometer control 141. The circuit 140 is basically an adding circuit configuration of an operational amplifier with one of the inputs being the x coordinate signal and the other input a fixed DC level of a magnitude and polarity determined by the setting of potentiometer control 141. The X-axis shift circuit 140 functions to add the DC signal to the coordinate signal to shift the X-axis to a particular location determined by the setting of the potentiometer control 141. The circuitry within block 80 is exemplary of an absolute value circuit using a pair of operational amplifiers. This circuit serves to perform the function of producing a positive output waveform corresponding to the absolute amplitude of an input waveform which may have both positive and negative polarities. The circuitry in block 30 is a form of phase shift circuitry wherein the phase shift is determined by the setting of the variable resistor within the bridge circuit receiving the output from oscillator 20 and feeding a difference amplifier. The block labelled EF is the emitter follower circuit shown in FIG. 10. The circuitry within block 50 is an X-size control circuit which basically involves attenuating the sinusoidal waveform output of block 30 by means of a variable voltage network which includes variable resistance 51. The X comparison circuit 110 includes an operational amplifier as shown and functions to produce a positive output signal when the input amplitude on the + side equals or exceeds the amplitude of the signal input on the − side of the operational amplifier. It will be apparent that the form of Y-axis shift circuit 130 in FIG. 3 is identical to X-axis shift circuit 140, the absolute value y circuit 70 is identical to the value x circuit 80, the Y comparison circuit 100 is identical in form to the X comparison circuit 110 and the Y-size circuit 40 is identical to the X-size circuit 50. Gate and hold circuit 120 may comprise a gate performing a logical "AND" function together with a monostable multivibrator or other type of holding or memory circuit.

It will be apparent from an understanding of the functioning of the circuit in FIG. 1 that various modifications of that circuit could be implemented to perform the same basic function. Forexample, the X and Y comparison circuits 110 and 100 could be gated by the timing circuit 90 so that comparisons are only performed during the timing interval. It should also be understood that other types of periodic waveforms other than sinusoidal waveforms could be employed to generate analog windows in accordance with this invention. For example, if a sawtooth type waveform were used, rectangular windows could be generated when the sawtooth waveforms are in phase, and by varying the phase relationship between the sawtooth waveforms various different shapes of windows would be generated. The type of window shape that would be generated by out-of-phase sawtooth waveforms can be determined by making the same sort of analysis as that for the out-of-phase sinusoidal waveforms.

Figure 11:
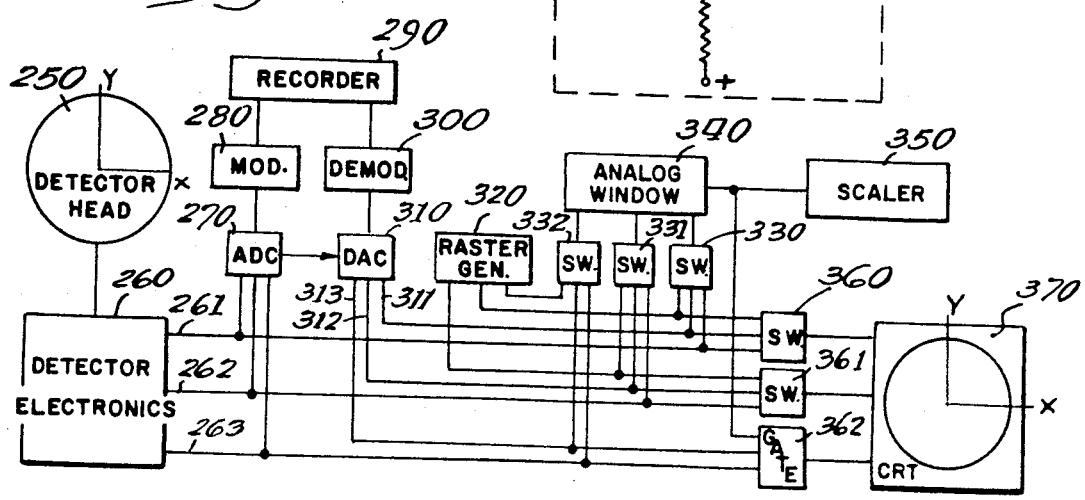
FIG. 11 is a block diagram of a scintillation camera system incorporating as one of its features an analog window apparatus in accordance with this invention.

In FIG. 11, the incorporation of analog window system in accordance with this invention into an Anger-type scintillation camera system which includes a form of direct data storage is shown. As is well known the Anger-type scintillation camera includes a detector head 250 employing a combination of a scintillation crystal and a matrix of photomultiplier tubes viewing the crystal together with detector electronics 260 which manipulate the signals from the matrix of phototubes into electronic signals representing the x and y coordinates of a scintillation occurring in the crystal and a third signal representing the energy of the scintillation event. Thus, the signals on leads 261 and 262 are typically x and y voltage pulses corresponding to the coordinates of the scintillation occurring in a fixed x and y coordinate system on the scintillation crystal and the signal on lead 263 is a pulse indication given when the x and y signals correspond to a scintillation event of a proper energy. As is well known, a large number of scintillation events are required to produce an image of the distribution of radioactivity within the object under investigation. The x and y signals on leads 261 and 262 may be fed directly to a cathode ray oscilloscope 370 through switching networks 360 and 361 and the unblanking or Z pulse on lead 263 may be fed directly to the unblanking terminal on the cathode ray oscilloscope through a gate circuit 362. In this mode of operation the scintillation events are displayed on the face of the cathode ray tube as they occur in the detector head and essentially all of the events of proper energy produce corresponding dots on the oscilloscope. In another mode of operation, the x and y coordinate signals on leads 261 and 262 may be digitized in an ADC (analog-to-digital converter) circuit 270 and then sent directly to a DAC (digital-to-analog converter) circuit 310 and from there to the cathode ray oscilloscope. In this mode, the x and y coordinate signals appear as dots on the cathode ray oscilloscope 370 in a regular matrix.

The x and y coordinate signals 261 and 262 may also be recorded directly on a tape recorder 290 by passing the signals through the same analog-to-digital conversion circuit 270 and then through a modulation circuit of some known type for writing the digital information on the recorder 290. Then, at a later time, the recorded data may be played back through a demodulation circuit 300 to recover the digital form of the $x$ and $y$ signals which are then fed through the digital-to-analog converter circuitry 310 into the oscilloscope. By storing the data in this form, the scintillation events are recorded in real time on a one-at-a-time basis and various portions of the study or all of the study can be replayed many times over if desired.

The analog window apparatus 340 may receive the coordinate signal data from detector electronics 260 either directly or after going through the ADC-DAC circuitry or after going through the total tape storage system. The particular setting of switches 330, 331 and 332 determines which mode the input data to analog window circuitry 340 is received. The analog window circuit 340 produces, in accordance with the above description of this invention, an output signal when a scintillation event occurs within the window. Thus, gate 362 may be constructed so that the oscilloscope will display only those $x$ and $y$ events which fall within the analog window. Correspondingly, it may be set up to display all $x$ and $y$ events for which a Z signal is received with the events falling within the analog window intensified either by providing a longer unblanking interval or some other known means. Gate 352 could also be set up to eliminate the events occurring in the analog window from the display on the oscilloscope. The output of analog window 340 may be fed to a scaler 350 to count the pulses from analog window apparatus 340 during any particular mode of operation.

In order to visualize the shape of the window a raster generator 321 may be provided to generate a full raster of $x$ and $y$ signals to be fed through the analog window apparatus so that the $x$ and $y$ signals falling within the window are displayed on the oscilloscope alone or intensified. Raster generator 320 may take the form of apparatus for producing a high-frequency horizontal sweep signal and a correspondingly low frequency vertical sweep signal both of which are sampled at rapid intervals to feed $x$ and $y$ pulses and trigger pulses to the analog window apparatus which switches 330, 331 and 332 are set to accept inputs from the raster generator 320.

The block diagram of FIG. 11 is a simplified picture of the complex system that would be required to implement these various functions. It will be apparent, however, that more than one analog window could be provided as mentioned above by duplicating some portions of the analog window circuitry. By recording the data from the scintillation camera in real time on magnetic tape a particular study performed with the camera can be replayed as many times as desired with various settings of the analog window to analyze various portions of the object being studied. It will be appreciated that this approach gives the user of the equipment essentially complete flexibility in using the data obtained during the study in that various portions of the object being studied can be made the subject of an analog window investigation and all sorts of comparisons and other procedures can be performed.

The analog window apparatus of this invention provides a great deal of flexibility to the use of a scintillation camera system to segregate portions of the object for individual study or comparison approaches. The fitting of the analog window to the region desired to be studied is facilitated by the various single window shapes which may be generated. It should be understood that various add and subtract logic may be used in conjunction with a plurality of analog windows to provide even greater overall window shaping capability.

The above description of a preferred embodiment of this invention is given by way of example only and numerous modifications could be made therein without departing from the scope of this invention as claimed in the following claims:

I claim:

1. Apparatus for signalling the inclusion of a point represented by a pair of coordinate signals within a selected spatial window comprising:
   means for producing a pair of periodic signals having the same frequency and a preselected phase and amplitude relation to determine said spatial window; and
   means for comparing each of said periodic signals with a corresponding one of said coordinate signals during at least one full period of said periodic signals and producing an output indication when the respective amplitudes of said periodic signals are simultaneously equal to or greater than the respective amplitudes of said corresponding coordinate signals.

2. Apparatus as claimed in claim 1, wherein said periodic signals have substantially the same phase so that said spatial window is substantially square or rectangular with a width and height dependent upon the respective maximum amplitudes of said periodic signal.

3. Apparatus as claimed in claim 1, wherein said means for producing a pair of periodic signals comprises:
   a sinusoidal waveform generator; and
   a pair of amplitude attenuating means receiving the output of said generator operative to produce a pair of sinusoidal waveforms having identical phase and selectable amplitudes, so that said in-phase sinusoidal waveforms determine substantially square or rectangular spatial windows of selectable width and height.

4. Apparatus as claimed in claim 1, wherein said means for producing a pair of periodic signals comprises:
   a sinusoidal waveform generator;
   a phase shift network receiving the output of said generator operative to produce a preselected phase-shifted sinusoidal waveform; and
   first and second amplitude attenuating means receiving the outputs, respectively, of said generator and said phase shift network operative to produce a pair of out-of-phase sinusoidal waveforms of selectable amplitude.

5. Apparatus as claimed in claim 4, wherein said sinusoidal waveforms are substantially 90° out-of-phase, so that said spatial window is substantially circular or ellipsoidal depending upon said amplitude relation.

6. Apparatus as claimed in claim 1, wherein said coordinate signals may have both positive and negative polarities; and wherein said means for comparing comprises:
   means for producing absolute amplitude signals corresponding to the respective amplitudes of said coordinate signals;

a pair of comparison means for simultaneously comparing each of said absolute value signals with said corresponding one of said periodic signals and producing respective indications during intervals when a corresponding periodic signal has an amplitude greater than or equal to its associated absolute value signal; and coincident means operative during at least one period of said periodic signals to produce said output indication upon coincidence of respective indications from said pair of comparison means, said spatial window thereby being symmetrical about the origin of the coordinate system associated with said coordinate signals and having a shape determined by said preselected phase and amplitude relation and the waveform of said periodic signals.

7. Apparatus for signalling the inclusion with a selected spatial window of a point represented by the polarity and amplitude of an $x$- coordinate signal and a $y$- coordinate signal, comprising:

means for producing first and second signals representing the absolute amplitudes of said $x$- and $y$- coordinate signals, respectively;

means for producing first and second periodic signals having the same frequency and a preselected phase and amplitude relation to determine a spatial window which is symmetrical about the origin of the coordinate system and has a configuration and size according to said preselected phase and amplitude relation and the waveform of each of said periodic signals;

first comparison means for producing a first output indication during intervals when the amplitude of said first periodic signal is equal to or greater than the amplitude of said first signal;

second comparison means for producing a second output indication during intervals when the amplitude of said second periodic signal is equal to or greater than the amplitude of said second signal; and means operative during at least one period of said periodic signals for producing a third output indication during intervals when said first and second output indications are coincident, said third output indication thereby being produced only when said point falls within said spatial window.

8. Apparatus as claimed in claim 7, wherein said first and second periodic signals have substantially the same phase, so that said spatial window is substantially square or rectangular with a width and height dependent upon the respective maximum amplitudes of said periodic signals.

9. Apparatus as claimed in claim 7, wherein said means for producing said first and second periodic signals comprise:

a generator for producing an original sinusoidal waveform;

a phase shift network receiving said original waveform operative to produce a second sinusoidal waveform having a preselected phase relation to said original waveform; and first and second amplitude attenuating means receiving said original and second sinusoidal waveforms, respectively, operative to produce, as said first and second periodic signals, first and second sinusoidal waveforms of preselected phase and amplitude.

10. Apparatus as claimed in claim 9, wherein said phase shift network provides either a 0° phase shift or a 90° phase shift so that said spatial window is either rectangular or ellipsoidal with width and height dependent upon the maximum amplitudes of said first and second sinusoidal waveforms.

* * * * *